US010427522B2

United States Patent
Shen

(10) Patent No.: US 10,427,522 B2
(45) Date of Patent: Oct. 1, 2019

(54) VEHICLE CONTROL WEARABLE APPARATUS, VEHICLE DRIVEABILITY CONTROL APPARATUS, AND SYSTEM AND METHOD FOR CONTROLLING A VEHICLE OPERATION

(71) Applicants: BOE TECHNOLOGY GROUP CO., LTD., Beijing (CN); K-tronics (Su Zhou) Technology Co., LTD., Wujiang District, Suzhou, Jiangsu (CN)

(72) Inventor: Rong Shen, Beijing (CN)

(73) Assignees: BOE TECHNOLOGY GROUP CO., LTD., Beijing (CN); K-tronics (Su Zhou) Technology Co., LTD., Wujiang District (CN)

( * ) Notice: Subject to any disclaimer, the term of this patent is extended or adjusted under 35 U.S.C. 154(b) by 89 days.

(21) Appl. No.: 15/565,380

(22) PCT Filed: Apr. 25, 2017

(86) PCT No.: PCT/CN2017/081870
§ 371 (c)(1),
(2) Date: Oct. 9, 2017

(87) PCT Pub. No.: WO2017/190607
PCT Pub. Date: Nov. 9, 2017

(65) Prior Publication Data
US 2018/0201131 A1 Jul. 19, 2018

(30) Foreign Application Priority Data
May 5, 2016 (CN) .......................... 2016 1 0292186

(51) Int. Cl.
*B60K 28/06* (2006.01)
*B60W 40/08* (2012.01)

(52) U.S. Cl.
CPC ............ *B60K 28/063* (2013.01); *B60K 28/06* (2013.01); *B60W 40/08* (2013.01); *B60W 2040/0836* (2013.01); *B60W 2540/24* (2013.01)

(58) Field of Classification Search
None
See application file for complete search history.

(56) References Cited

U.S. PATENT DOCUMENTS 6,075,444 A * 6/2000 Sohege .................... A61B 5/18
180/272
6,726,636 B2 * 4/2004 Der Ghazarian .... B60K 28/063
422/84

(Continued)

FOREIGN PATENT DOCUMENTS

CN     1197018 A    10/1998
CN     1853023 A    10/2006

(Continued)

OTHER PUBLICATIONS

International Search Report & Written Opinion dated Jul. 20, 2017, regarding PCT/CN2017/081870.

(Continued)

*Primary Examiner* — Drew J Brown
(74) *Attorney, Agent, or Firm* — Intellectual Valley Law, P.C.

(57) ABSTRACT

The present application discloses a vehicle control wearable apparatus. The vehicle control wearable apparatus includes a detector configured to detect an intoxicating substance intake level of a potential driver of a vehicle; a vehicle operation state controller coupled to the detector and configured to receive the intoxicating substance intake level from the detector; and a first data transceiver coupled to the vehicle operation state controller. The vehicle operation state controller is configured to conduct a comparison (Continued)

between the intoxicating substance intake level and a first threshold level, and control the first data transceiver to send a blocking signal based on a first result of the comparison at a first time point. The blocking signal controlling the vehicle in a blocked state thereby prevents the potential driver from driving the vehicle.

19 Claims, 6 Drawing Sheets

(56) References Cited

U.S. PATENT DOCUMENTS

| | | | |
|---|---|---|---|
| 9,707,845 B1* | 7/2017 | Nienhouse | H04Q 9/00 |
| 2005/0230175 A1 | 10/2005 | Brown et al. | |
| 2006/0237253 A1* | 10/2006 | Mobley | B60K 28/063 |
| | | | 180/272 |
| 2009/0278698 A1 | 11/2009 | Kamiki | |
| 2011/0193708 A1* | 8/2011 | Comeau | B60K 28/063 |
| | | | 340/576 |
| 2013/0285816 A1* | 10/2013 | Sezanayev | B60K 28/063 |
| | | | 340/576 |
| 2015/0244452 A1* | 8/2015 | Grohman | G01N 33/497 |
| | | | 340/539.12 |
| 2016/0280230 A1* | 9/2016 | Hsieh | B60Q 9/00 |
| 2017/0144628 A1* | 5/2017 | Liu | B60R 25/08 |
| 2017/0151959 A1* | 6/2017 | Boesen | A61B 5/18 |
| 2018/0101721 A1* | 4/2018 | Nienhouse | G06N 7/005 |
| 2019/0009786 A1* | 1/2019 | Liu | B60C 23/02 |

FOREIGN PATENT DOCUMENTS

| | | |
|---|---|---|
| CN | 201395120 Y | 2/2010 |
| CN | 102303529 A | 1/2012 |
| CN | 102745081 A | 10/2012 |
| CN | 103434400 A | 12/2013 |
| CN | 104477091 A | 4/2015 |
| CN | 105185034 A | 12/2015 |
| CN | 205022381 U | 2/2016 |
| JP | 4050608 B2 | 2/2008 |
| JP | 2008539127 A | 11/2008 |
| WO | 2006130129 A1 | 12/2006 |

OTHER PUBLICATIONS

First Office Action in the Chinese Patent Application No. 201610292186.1, dated Oct. 31, 2017 English translation attached.

* cited by examiner

VEHICLE CONTROL WEARABLE APPARATUS, VEHICLE DRIVEABILITY CONTROL APPARATUS, AND SYSTEM AND METHOD FOR CONTROLLING A VEHICLE OPERATION

CROSS-REFERENCE TO RELATED APPLICATION

This application is a national stage application under 35 U.S.C. § 371 of International Application No. PCT/CN2017/081870, filed Apr. 25, 2017, which claims priority to Chinese Patent Application No. 201610292186.1, filed May 5, 2016, the contents of which are incorporated by reference in the entirety.

TECHNICAL FIELD

The present invention relates to vehicular smart apparatuses, more particularly, to a vehicle control wearable apparatus, a vehicle driveability control apparatus, a system for controlling a vehicle operation, and a method for controlling a vehicle operation.

BACKGROUND

Driving under influence, particularly with alcohol, is the cause of many injuries and even deaths and thus poses a serious problem to the modern society. Many drunk drivers are chronic alcoholics who knowingly become intoxicated. However, many others drunk drivers are merely social drinkers who did not intend to drive while intoxicated. For example, these people may go to social events with a good intention not to overindulge themselves, but eventually lose track of how many glasses of wine they have enjoyed and become intoxicated. When they leave the social events, they may try to drive the vehicle because their judgment has been impaired by the intoxication. Many accidents may be prevented from happening if drunk drivers are not able to drive while intoxicated.

SUMMARY

In one aspect, the present invention provides a vehicle control wearable apparatus, comprising a detector configured to detect an intoxicating substance intake level of a potential driver of a vehicle; a vehicle operation state controller coupled to the detector and configured to receive the intoxicating substance intake level from the detector, and a first data transceiver coupled to the vehicle operation state controller; wherein the vehicle operation state controller is configured to conduct a comparison between the intoxicating substance intake level and a first threshold level, and control the first data transceiver to send a blocking signal based on a first result of the comparison at a first time point; the blocking signal controlling the vehicle in a blocked state thereby prevents the potential driver from driving the vehicle; and the first result of the comparison indicates that the intoxicating substance intake level is greater than the first threshold level.

Optionally, the first data transceiver is configured to receive a vehicle operation state signal from the vehicle indicating that the vehicle is in a blocked state; the vehicle operation state controller is configured to conduct the comparison between the intoxicating substance intake level and a second threshold level at a second time point later in time than the first time point, and control the first data transceiver to send an unblocking signal based on a second result of the comparison at the second time point; the unblocking signal controlling the vehicle to transition from the blocked state to an unblocked state in which the vehicle is drivable; and the second result of the comparison indicates that the intoxicating substance intake level is lower than or equal to the second threshold level.

Optionally, the vehicle control wearable apparatus further comprises an anticircumvention device coupled to the vehicle operation state controller; wherein the vehicle operation state controller is configured to control the anticircumvention device to render the vehicle control wearable apparatus unremovable from the potential driver based on the first result of the comparison.

Optionally, the vehicle control wearable apparatus further comprises an anticircumvention device coupled to the vehicle operation state controller; wherein the vehicle operation state controller is configured to control the anticircumvention device to render the vehicle control wearable apparatus removable from the potential driver based on the second result of the comparison.

Optionally, the vehicle control wearable apparatus further comprises an alarm device; wherein the vehicle operation state controller is configured to control the alarm device to generate an alarm based on the first result of the comparison.

Optionally, the vehicle control wearable apparatus further comprises an alarm device; wherein the vehicle operation state controller is configured to control the alarm device to generate an alarm based on the first result of the comparison; and the vehicle operation state controller is configured to control the alarm device to turn off the alarm based on the second result of the comparison.

In another aspect, the present invention provides a vehicle driveability control apparatus, comprising a second data transceiver configured to receive a blocking signal for controlling a vehicle in a blocked state that prevents a potential driver from driving the vehicle; a vehicle driveability controller coupled to the second data transceiver and configured to receive the blocking signal from the second data transceiver; and one or more actuators coupled to the vehicle driveability controller; wherein the vehicle driveability controller is configured to control the one or more actuators to render the vehicle in the blocked state.

Optionally, the vehicle driveability controller, upon receiving the blocking signal, is configured to send a first actuating signal to the one or more actuators, upon receiving the first actuating signal the one or more actuators are configured to prevent an electric vehicle door lock of the vehicle from receiving a signal form an electric vehicle door key to unlock the electric car door lock thereby controlling the vehicle in a blocked state.

Optionally, the one or more actuators are configured to send a vehicle operation state signal indicating that the vehicle is in the blocked state to the vehicle driveability controller; and upon receiving the vehicle operation state signal the vehicle driveability controller is configured to control the second data transceiver to send the vehicle operation state signal.

Optionally, the second data transceiver, subsequent to sending the vehicle operation state signal indicating that the vehicle is in the blocked state, is configured to receive an unblocking signal, and send the unblocking signal to the vehicle driveability controller; and the vehicle driveability controller, upon receiving the unblocking signal, is configured to control the one or more actuators to render the vehicle transitioning from the blocked state to an unblocked state in which the vehicle is drivable.

Optionally, the vehicle driveability controller, upon receiving the unblocking signal, is configured to send a second actuating signal to the one or more actuators; and the one or more actuators, upon receiving the second actuating signal, is configured to enable the electric vehicle door lock to receive a signal from the electric vehicle door key to unlock the electric car door lock.

In another aspect, the present invention provides a system for controlling a vehicle operation, comprising a vehicle control wearable apparatus and a vehicle driveability control apparatus; wherein the vehicle control wearable apparatus comprises a detector configured to detect an intoxicating substance intake level of a potential driver of a vehicle; a vehicle operation state controller coupled to the detector and configured to receive the intoxicating substance intake level from the detector; and a first data transceiver coupled to the vehicle operation state controller; wherein the vehicle driveability control apparatus comprises a second data transceiver; a vehicle driveability controller coupled to the second data transceiver; and one or more actuators coupled to the vehicle driveability controller; wherein the vehicle operation state controller is configured to conduct a comparison between the intoxicating substance intake level and a first threshold level, and control the first data transceiver to send a blocking signal to the second data transceiver based on a first result of the comparison at a first time point, the blocking signal controlling the vehicle in the blocked state thereby prevents the potential driver from driving the vehicle; the second data transceiver is configured to receive the blocking signal from the first data transceiver and send the blocking signal to the vehicle driveability controller; the vehicle driveability controller, upon receiving the blocking signal from the second data transceiver, is configured to control the one or more actuators to render the vehicle in the blocked state; and the first result of the comparison indicates that the intoxicating substance intake level is greater than the first threshold level.

Optionally, the vehicle driveability controller, upon receiving the blocking signal, is configured to send a first actuating signal to the one or more actuators; and upon receiving the first actuating signal the one or more actuators are configured to prevent an electric vehicle door lock of the vehicle from receiving a signal form an electric vehicle door key to unlock the electric car door lock thereby controlling the vehicle in a blocked state.

Optionally, the one or more actuators are configured to send a vehicle operation state signal indicating that the vehicle is in the blocked state to the vehicle driveability controller; upon receiving the vehicle operation state signal the vehicle driveability controller is configured to control the second data transceiver to send the vehicle operation state signal to the first data transceiver; the first data transceiver is configured to receive the vehicle operation state signal from the second data transceiver indicating that the vehicle is in the blocked state; the vehicle operation state controller is configured to conduct the comparison between the intoxicating substance intake level and a second threshold level at a second time point later in time than the first time point, and control the first data transceiver to send an unblocking signal based on a second result of the comparison at the second time point; the unblocking signal controlling the vehicle to transition from the blocked state to an unblocked state in which the vehicle is drivable; and the second result of the comparison indicates that the intoxicating substance intake level is lower than or equal to the second threshold level.

Optionally, the second data transceiver, upon receiving the unblocking signal, sends the unblocking signal to the vehicle driveability controller; and the vehicle driveability controller, upon receiving the unblocking signal, is configured to control the one or more actuators to render the vehicle transitioning from the blocked state to an unblocked state in which the vehicle is drivable.

Optionally, the vehicle driveability controller, upon receiving the unblocking signal, is configured to send a second actuating signal to the one or more actuators; and the one or more actuators, upon receiving the second actuating signal, is configured to enable the electric vehicle door lock to receive a signal from the electric vehicle door key to unlock the electric car door lock.

In another aspect, the present invention provides a method of controlling a vehicle operation in a system described herein, comprising detecting an intoxicating substance intake level of a potential driver of a vehicle; conducting a comparison between the intoxicating substance intake level and a first threshold level; sending a blocking signal based on a first result of the comparison at a first time point; and controlling the vehicle in a blocked state thereby prevents the potential driver from driving the vehicle based on the blocking signal; wherein the first result of the comparison indicates that the intoxicating substance intake level is greater than the first threshold level.

Optionally, the method further comprises receiving a vehicle operation state signal from the vehicle indicating that the vehicle is in the blocked state; conducting the comparison between the intoxicating substance intake level and a second threshold level at a second time point later in time than the first time point; sending an unblocking signal based on a second result of the comparison at the second time point; and controlling the vehicle to transition from the blocked state to an unblocked state in which the vehicle is drivable based on the unblocking signal; wherein the second result of the comparison indicates that the intoxicating substance intake level is lower than or equal to the second threshold level.

Optionally, controlling the vehicle in the blocked state comprises preventing an electric vehicle door lock of the vehicle from receiving a signal form an electric vehicle door key to unlock the electric car door lock thereby controlling the vehicle in a blocked state.

Optionally, controlling the vehicle to transition from the blocked state to the unblocked state comprises enabling the electric vehicle door lock to receive a signal from the electric vehicle door key to unlock the electric car door lock.

BRIEF DESCRIPTION OF THE FIGURES

The following drawings are merely examples for illustrative purposes according to various disclosed embodiments and are not intended to limit the scope of the present invention.

DETAILED DESCRIPTION

Figure 1:
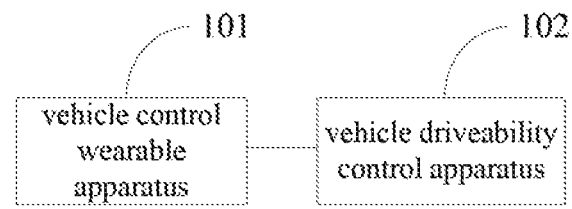
FIG. 1 is a schematic diagram illustrating the structure of a system for controlling a vehicle operation in some embodiments according to the present disclosure.

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Currently, driving under influence (e.g., the drunk driving) is prevented by random check performed by the police. Typically, the driver is required to take a breath test by employing a mouth piece and measuring the alcohol level emanated from the user's breath. The breath test is a simple and quick method to detect the intoxicating substance intake level of the drunk driver. When using the breath test device, the drunk driver is required to take a deep breath, and exhale for more than 3 seconds into the mouth piece. A breath alcohol level can be measured by this method. Further, a blood alcohol level can be calculated from the breath alcohol level by multiplying the breath alcohol level by a factor of 2200. Although the breath test is an effective method for identifying drunk drivers, it can only be conducted during a random inspection by the police when the drunk driving behavior is observed or suspected. It cannot prevent the driving under influence behavior by preventing the drunk driver (e.g., social drinkers with impaired judgment) from operating the vehicle, e.g., before the drunk driver even drives the vehicle.

Accordingly, the present invention provides, inter alia, a vehicle control wearable apparatus, a vehicle driveability control apparatus, a system for controlling a vehicle operation, and a method for controlling a vehicle operation that substantially obviate one or more of the problems due to limitations and disadvantages of the related art. In one aspect, the present disclosure provides a vehicle control wearable apparatus. In some embodiments, the vehicle control wearable apparatus includes an intoxicating substance level detector configured to detect in real time an intoxicating substance intake level of a potential driver of a vehicle; a vehicle operation state controller coupled to the intoxicating substance level detector and configured to receive the intoxicating substance intake level from the intoxicating substance level detector; and a first data transceiver coupled to the vehicle operation state controller. Optionally, the vehicle operation state controller is configured to conduct a comparison between the intoxicating substance intake level and a first threshold level at a first time point, and control the first data transceiver to send a blocking signal based on a first result of the comparison at the first time point; the blocking signal controlling the vehicle in a blocked state that prevents the potential driver from driving the vehicle. In another aspect, the present disclosure provides a vehicle driveability control apparatus. In some embodiments, the vehicle driveability control apparatus includes a second data transceiver configured to receive a blocking signal for controlling the vehicle in a blocked state that prevents the potential driver from driving the vehicle; a vehicle driveability controller coupled to the second data transceiver and configured to receive the blocking signal from the second data transceiver; and one or more actuators coupled to the vehicle driveability controller. Optionally, the vehicle driveability controller is configured to control the one or more actuators to render the vehicle in the blocked state. In another aspect, the present disclosure provides a system for controlling a vehicle operation, the system includes the vehicle control wearable apparatus described herein and the vehicle driveability control apparatus described herein. In another aspect, the present disclosure provides a method of controlling a vehicle operation. In some embodiments, the method includes detecting in real time an intoxicating substance intake level of a potential driver of a vehicle; conducting a comparison between the intoxicating substance intake level and a first threshold level at a first time point; sending a blocking signal based on a first result of the comparison at the first time point; and controlling the vehicle in a blocked state that prevents the potential driver from driving the vehicle based on the blocking signal.

Optionally, the vehicle control wearable apparatus is wearable on a potential driver, e.g., on the wrist of the potential driver. Optionally, the vehicle driveability control apparatus is installed in a vehicle.

In some embodiments, the one or more actuators are configured to send a vehicle operation state signal indicating that the vehicle is in the blocked state to the vehicle driveability controller; upon receiving the vehicle operation state signal the vehicle driveability controller is configured to control the second data transceiver to send the vehicle operation state signal to the first data transceiver; and the first data transceiver is configured to receive the vehicle operation state signal from the second data transceiver indicating that the vehicle is in the blocked state. The vehicle operation state controller is then configured to conduct the comparison between the intoxicating substance intake level and a second threshold level at a second time point later in time than the first time point, and control the first data transceiver to send an unblocking signal based on a second result of the comparison at the second time point; the unblocking signal controlling the vehicle to transition from the blocked state to an unblocked state in which the vehicle is drivable, the second resulting being different from the first result.

In some embodiments, the first result of the comparison indicates that the intoxicating substance intake level is greater than the first threshold level. In some embodiments, the second result of the comparison indicates that the intoxicating substance intake level is lower than or equal to the second threshold level. Optionally, the second threshold value is the same as the first threshold value. Optionally, the second threshold value is different from the first threshold value.

Using the present apparatuses and systems, for example, social drinkers may put on the vehicle control wearable apparatus before attending a party with the intention to avoid drunk driving later in time if they drink too much. Even if they do drink too much and lose their judgment, their attempt to drive while intoxicated will not succeed because the vehicle control wearable apparatus will effectively prevent them from driving the vehicle.

As used herein, the term "in real time" relates to a situation where an action is being performed as an event occurs. In the context of the present disclosure, the term "in real time" may include, but is not limited to, immediate, rapid, not requiring operator intervention, automatic, and/or programmed. Optionally, in real time may include detecting or measuring substantially continuously, i.e., one action is performed as soon as the previous one is finished. Optionally, in real time may include, but is not limited to, measurements or detections in femtoseconds, picoseconds, nanoseconds, milliseconds, as well as longer, and optionally shorter, time intervals.

Optionally, the intoxicating substance is alcohol, and the intoxicating substance level detector is an alcohol level detector configured to detect an alcohol intake level of a potential driver of a vehicle. Optionally, the intoxicating substance is marijuana, and the intoxicating substance level detector is a marijuana level detector configured to detect a marijuana intake level of a potential driver of a vehicle. Optionally, the intoxicating substance is cocaine or a cocaine derived substance, and the intoxicating substance level detector is a cocaine or a cocaine derived substance level detector configured to detect a cocaine or a cocaine derived substance intake level of a potential driver of a vehicle. Optionally, the intoxicating substance is opium or an opium derived substance, and the intoxicating substance level detector is an opium or an opium derived substance level detector configured to detect an opium or an opium derived substance intake level of a potential driver of a vehicle.

In some embodiments, the comparison may yield a third result of comparison. Optionally, the third result of the comparison indicates that the intoxicating substance intake level is greater than the second threshold level but lower than or equal to the first threshold level, the second threshold value being different from the first threshold value (e.g., a low level of alcohol intake). When the third result of comparison is provided, the vehicle control wearable apparatus provides a warning to persuade the potential driver not to drive the vehicle but wait until the alcohol level further decreases, or ask for a third party to give the potential driver a ride home. For example, in some embodiments, the vehicle operation state controller is configured to conduct a comparison between the intoxicating substance intake level and a first threshold level and a second threshold level at a third time point, and the vehicle operation state controller is configured to control the alarm device to generate an alarm based on the third result of the comparison, the alarm persuading the potential driver not to drive the vehicle. Optionally, the third time point may be an initial time point. Optionally, the third time point may be later in time than the first time point. Optionally, the vehicle operation state controller is configured to control the first data transceiver to send a restricting signal based on the third result of the comparison at the third time point; the restricting signal controlling the vehicle in a restricted state. In the restricted state, the vehicle is blocked, but the potential driver is prompted to confirm whether or not the potential driver insists to drive the vehicle. If the potential driver confirms that she intends to drive the vehicle regardless the warning, the vehicle will be controlled to transition into an unblocked state, allowing the potential driver to drive the vehicle.

FIG. 1 is a schematic diagram illustrating the structure of a system for controlling a vehicle operation in some embodiments according to the present disclosure. Referring to FIG. 1, the system for controlling a vehicle operation includes a vehicle control wearable apparatus 101 and a vehicle driveability control apparatus 102. The vehicle control wearable apparatus 101 is configured to detect in real time an intoxicating substance intake level of a potential driver of a vehicle; compare the detected intoxicating substance intake level with a first threshold level; and send a blocking signal to the vehicle driveability control apparatus 102 when the detected intoxicating substance intake level is higher than the first threshold level. The vehicle driveability control apparatus 102 is configured to receive the blocking signal from the vehicle control wearable apparatus 101; and, based on the blocked signal, control the vehicle in a blocked state that prevents the potential driver from driving the vehicle.

The present system for controlling a vehicle operation includes a vehicle control wearable apparatus and a vehicle driveability control apparatus. The vehicle control wearable apparatus is wearable on a potential driver's body, and is capable of detecting an intoxicating substance intake level of the potential driver in real time, and comparing the detected intoxicating substance intake level with a first threshold level. When the detected intoxicating substance intake level is greater than the t first threshold value, the vehicle control wearable apparatus sends a blocking signal to the vehicle driveability control apparatus. Based on the received blocking signal, the vehicle driveability control apparatus is capable of controlling the vehicle in a blocked state that prevents the potential driver from driving the vehicle. In the present system, before a drunk driver can drive the vehicle, the vehicle control wearable apparatus can promptly determine that the intoxicating substance intake level of the drunk driver is greater than the first threshold level, and promptly control the vehicle in a blocked state that prevents the drunk driver from driving the vehicle. The present system thus can effectively prevent driving under influence (DUI) behavior by preventing the drunk driver from operating a vehicle after drinking.

Examples of vehicle control wearable apparatuses include, but are not limited to, a smart watch, an electronic ring, an electronic necklace, an electronic bracelet, an electronic tattoo, an electronic badge, an electronic fitness monitoring device, a smart wristband, an electronic hat, smart glasses, a wearable apparatus that is worn on clothing, a wearable apparatus that when worn contacts human skin. In some embodiments, the vehicle control wearable apparatus further includes a processor, a memory, a user interface including a display and an input device. Optionally, the vehicle control wearable apparatus further includes a security authentication system, e.g., a fingerprint recognition system or a voice recognition system. Optionally, the vehicle control wearable apparatus further includes a power supply. Optionally, the vehicle control wearable apparatus is a bracelet.

In some embodiments, the vehicle control wearable apparatus further includes one or more sensor (e.g., a sensor array). The one or more sensor is capable of detecting an intoxicating substance intake level of a person wearing the vehicle control wearable apparatus (e.g., a potential driver). Optionally, the one or more sensor is capable of detecting an alcohol intake level of the person wearing the vehicle control wearable apparatus. Optionally, the one or more sensor is capable of detecting a blood alcohol concentration (BAC) of the person wearing the vehicle control wearable apparatus. Optionally, the first threshold level for comparison is a BAC of 0.08%. Optionally, the first threshold level for comparison is a BAC of 0.05%. For example, the one or more sensor may a sensor on a bracelet that is configured to detect a BAC around a wrist of the person wearing the bracelet.

In some embodiments, the vehicle driveability control apparatus is installed in the vehicle. When the vehicle is in a blocked state, the vehicle cannot be driven by a potential driver or any third party. Optionally, when the vehicle is in the blocked state, a door of the vehicle cannot be opened. Optionally, when the vehicle is in the blocked state, the vehicle cannot be started. Optionally, when the vehicle is in the blocked state, the vehicle ignition cannot occur. Optionally, when the vehicle is in the blocked state, the brake of the vehicle cannot be released. Optionally, when the vehicle is in the blocked state, the throttle of the vehicle is actuated so that no fuel can enter the engine. Optionally, when the vehicle is in the blocked state, the steering wheel of the vehicle is locked.

Figure 2:
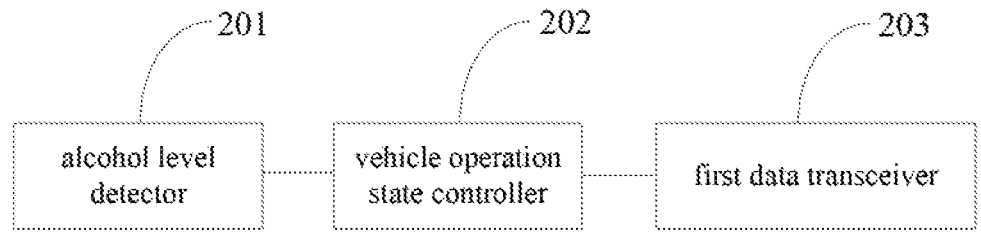
FIG. 2 is a schematic diagram illustrating the structure of a vehicle control wearable apparatus in some embodiments according to the present disclosure.

FIG. 2 is a schematic diagram illustrating the structure of a vehicle control wearable apparatus in some embodiments according to the present disclosure. Referring to FIG. 2, the vehicle control wearable apparatus in some embodiments includes an intoxicating substance level detector 201, a vehicle operation state controller 202 coupled to the intoxicating substance level detector 201, and a first data transceiver 203 coupled to the vehicle operation state controller 202. The intoxicating substance level detector 201 is configured to detect in real time an intoxicating substance intake level of a potential driver of a vehicle, and send the intoxicating substance intake level to the vehicle operation state controller 202. The vehicle operation state controller 202 is coupled to the intoxicating substance level detector 201 and configured to receive the intoxicating substance intake level from the intoxicating substance level detector 201. Further, the vehicle operation state controller is configured to conduct a comparison between the intoxicating substance intake level and a first threshold level at a first time point, and control the first data transceiver to send a blocking signal based on a first result of the comparison at the first time point. The blocking signal controls the vehicle in a blocked state that prevents the potential driver from driving the vehicle. Optionally, the first result of the comparison indicates that the potential driver is drunk, e.g., the detected intoxicating substance intake level is greater than the threshold vale. Optionally, the first result of the comparison indicates that the detected BAC value is greater than 0.08%. Optionally, the first result of the comparison indicates that the detected BAC value is greater than 0.05%.

In the present vehicle control wearable apparatus, the vehicle control wearable apparatus is wearable on a potential driver's body. The intoxicating substance level detector of the vehicle control wearable apparatus is capable of detecting an intoxicating substance intake level of the potential driver in real time, and sending the detected intoxicating substance intake level to the vehicle operation state controller. The vehicle operation state controller is capable of comparing the detected intoxicating substance intake level with a first threshold level. When the detected intoxicating substance intake level is greater than the first threshold level, the vehicle operation state controller controls the first data transceiver to send a blocking signal to control the vehicle in a blocked state that prevents the potential driver from driving the vehicle. Using the present vehicle control wearable apparatus, before a drunk driver can even drive the vehicle, the vehicle control wearable apparatus can promptly determine that the intoxicating substance intake level of the drunk driver is greater than the first threshold level, and promptly control the vehicle in the blocked state that prevents the drunk driver from driving the vehicle. The present vehicle control wearable apparatus thus can effectively prevent driving under influence behavior by preventing the drunk driver from operating a vehicle after drinking.

Examples of intoxicating substance level detectors include, but are not limited to, a intoxicating substance skin contact detector having one or more skin contact sensors (e.g., a skin contact sensor array) and an infrared intoxicating substance detector having one or more infrared sensors (e.g., an infrared sensor array). The intoxicating substance level detector in the present vehicle control wearable apparatus is configured to accurately detect the intoxicating substance level and is resistant to external disturbance. In one example, the intoxicating substance level detector is a blood alcohol skin contact detector having one or more blood alcohol skin sensors (e.g., a blood alcohol skin sensor array). In another example, the intoxicating substance level detector is an infrared alcohol detector having one or more infrared alcohol sensors (e.g., an infrared alcohol sensor array). The alcohol level detector in the present vehicle control wearable apparatus is configured to accurately detect the alcohol level and is resistant to external disturbance.

Optionally, the vehicle operation state controller includes a single-chip computer, e.g., a nRF51822 manufactured by Nordic.

Any appropriate wireless transceiver may be used as the first data transceiver according to the present disclosure. Optionally, the first data transceiver includes a Bluetooth capable of sending a Bluetooth feature code.

Optionally, the vehicle control wearable apparatus is a bracelet. Optionally, one or more sensors (e.g., a sensor array) in the bracelet are capable of detecting an intoxicating substance intake level of a person wearing the vehicle control wearable apparatus (e.g., a potential driver).

Referring to FIG. 2, in some embodiments, the first data transceiver 203 is configured to receive a vehicle operation state signal from the vehicle (e.g., from the vehicle driveability control apparatus) indicating that the vehicle is in a blocked state. The vehicle operation state controller 202 is configured to conduct a comparison between the intoxicating substance intake level and the second threshold level at a second time point later in time than the first time point, and control the first data transceiver 203 to send an unblocking signal based on a second result of the comparison at the second time point. The unblocking signal controls the vehicle to transition from the blocked state to an unblocked state in which the vehicle is drivable. Optionally, the second result of the comparison indicates that the potential driver is not drunk, e.g., the detected intoxicating substance intake level is lower than or equal to the threshold vale. Optionally, the second result of the comparison indicates that the detected BAC value is lower than or equal to 0.08%. Optionally, the second result of the comparison indicates that the detected BAC value is lower than or equal to 0.05%. Optionally, the second threshold level is the same as the first threshold level. Optionally, the second threshold level is different from the first threshold level.

By having this design, the vehicle control wearable apparatus controls the vehicle in the blocked state when the intoxicating substance intake level detected in the potential driver is greater than the first threshold level. When the intoxicating substance intake level detected in the potential driver decreases over time to a level that is lower than or equal to the second threshold level, the vehicle control wearable apparatus can further control the operation state of the vehicle based on a feedback from the vehicle on the current operation state of the vehicle. For example, when the feedback from the vehicle indicates that the current operation state of the vehicle is a blocked state, the vehicle operation state controller 202 can control the first data transceiver 203 to send the unblocking signal to control to vehicle to transition from the blocked state to an unblocked state in which the vehicle is drivable. This allows the potential driver to operate the vehicle safely when the potential driver is no longer under influence, e.g., not drunk. In another example, when the feedback from the vehicle indicates that the current operation state of the vehicle is already an unblocking state, it is not necessary for the vehicle operation state controller 202 to control the first data transceiver 203 to send the unblocking signal, obviating unnecessary work process.

Figure 3:
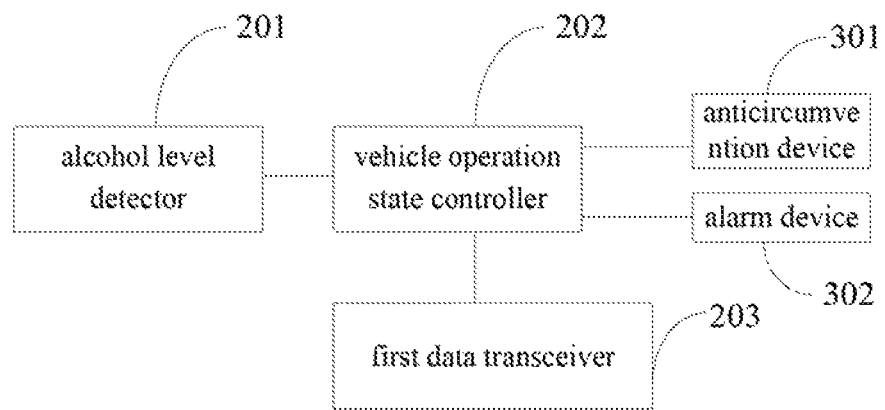
FIG. 3 is a schematic diagram illustrating the structure of a vehicle control wearable apparatus in some embodiments according to the present disclosure.

FIG. 3 is a schematic diagram illustrating the structure of a vehicle control wearable apparatus in some embodiments according to the present disclosure. Referring to FIG. 3, the vehicle control wearable apparatus in some embodiments further includes an anticircumvention device 301 coupled to the vehicle operation state controller 202. The vehicle operation state controller 202 is configured to control the anticircumvention device 301 to render the vehicle control wearable apparatus unremovable from the potential driver based on the first result of the comparison. For example, the vehicle operation state controller 202 is configured to control the anticircumvention device 301 to render the vehicle control wearable apparatus unremovable from the potential driver when the intoxicating substance intake level detected in the potential driver is greater than the first threshold level. By having the anticircumvention device 301, the potential driver is not allowed to remove the vehicle control wearable apparatus, e.g., by force, by the potential driver's body. Also, the anticircumvention device 301 can prevent the potential driver from circumventing the system by having a third party who is not drunk to use the vehicle control wearable apparatus to unblock the vehicle for the potential driver.

In some embodiments, the vehicle operation state controller 202 is configured to control the anticircumvention device 301 to render the wearable apparatus removable from the potential driver based on the second result of the comparison. For example, when the first data transceiver 203 receives a vehicle operation state signal from the vehicle indicating that the vehicle is in an unblocked state, the vehicle operation state controller 202 is configured to control the anticircumvention device 301 to render the wearable apparatus removable from the potential driver. When the intoxicating substance intake level detected in the potential driver decreases over time to a level that is lower than or equal to the second threshold level, the vehicle control wearable apparatus can further control the operation state of the vehicle based on a feedback from the vehicle on the current operation state of the vehicle. Optionally, the second threshold level is the same as the first threshold level. Optionally, the second threshold level is different from the first threshold level. For example, when the feedback from the vehicle indicates that the current operation state of the vehicle is a blocked state, the vehicle operation state controller 202 can, based on the second result of the comparison, control the first data transceiver 203 to send the unblocking signal to control to vehicle to transition from the blocked state to an unblocked state in which the vehicle is drivable, and further control the anticircumvention device 301 to render the vehicle control wearable apparatus removable from the potential driver. This allows the potential driver to freely remove the vehicle control wearable apparatus when the potential driver is no longer under influence, e.g., not drunk.

Examples of anticircumvention devices include, but are not limited to, an electronic lock.

Referring to FIG. 3, the vehicle control wearable apparatus in some embodiments further includes an alarm device 302 coupled to the vehicle operation state controller 202. The vehicle operation state controller 202 is configured to control the alarm device 302 to generate an alarm based on the first result of the comparison. For example, the vehicle operation state controller 202 is configured to control the alarm device 302 to generate an alarm when the intoxicating substance intake level detected in the potential driver is greater than the first threshold level. The alarm informs the potential driver that the potential driver is not allowed to drive the vehicle under influence.

In some embodiments, the vehicle operation state controller 202 is configured to control the alarm device 302 to turn off the alarm based on the second result of the comparison. For example, when the first data transceiver 203 receives a vehicle operation state signal from the vehicle indicating that the vehicle is in an unblocked state, the vehicle operation state controller 202 is configured to control the alarm device 302 to turn off the alarm. When the intoxicating substance intake level detected in the potential driver decreases over time to a level that is lower than or equal to the second threshold level, the vehicle control wearable apparatus can further control the operation state of the vehicle based on a feedback from the vehicle on the current operation state of the vehicle. Optionally, the second threshold level is the same as the first threshold level. Optionally, the second threshold level is different from the first threshold level. For example, when the feedback from the vehicle indicates that the current operation state of the vehicle is a blocked state, the vehicle operation state controller 202, based on the second result of the comparison, can control the first data transceiver 203 to send the unblocking signal to control to vehicle to transition from the blocked state to an unblocked state in which the vehicle is drivable, and further control the alarm device 302 to turn off the alarm.

Examples of alarms include, but are not limited to, a voice alarm and a vibration alarm. In one example, the alarm device 302 generates a voice alarm to inform the potential driver that the potential driver is not allowed to drive the vehicle under influence. In another example, the alarm device 302 generates a vibration alarm to inform the potential driver that the potential driver is not allowed to drive the vehicle under influence. In another example, the alarm device 302 generates both a voice alarm and a vibration alarm to inform the potential driver that the potential driver is not allowed to drive the vehicle under influence.

Figure 4:
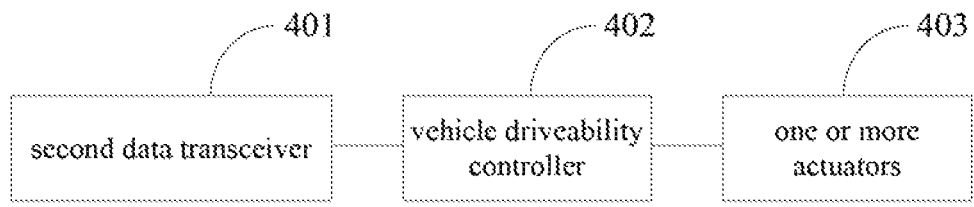
FIG. 4 is a schematic diagram illustrating the structure of a vehicle driveability control apparatus in some embodiments according to the present disclosure.

FIG. 4 is a schematic diagram illustrating the structure of a vehicle driveability control apparatus in some embodiments according to the present disclosure. Referring to FIG. 4, the vehicle driveability control apparatus in some embodiments includes a second data transceiver 401, a vehicle driveability controller 402, and one or more actuators 403. The second data transceiver 401 is coupled to the vehicle driveability controller 402. The vehicle driveability controller 402 is coupled to the one or more actuators 403. The second data transceiver 401 is configured to receive a blocking signal (e.g., from the first data transceiver 203 in FIG. 2) for controlling the vehicle in a blocked state that prevents the potential driver from driving the vehicle. The second data transceiver 401 sends the blocking signal to the vehicle driveability controller 402. Upon receiving the blocking signal from the second data transceiver 401, the vehicle driveability controller 402 is configured to control the one or more actuators 403 to render the vehicle in the blocked state.

In the present vehicle driveability control apparatus, the second data transceiver receives the blocking signal, and sends the blocking signal to the vehicle driveability controller. Based on the received blocking signal, the vehicle driveability controller controls the one or more actuators to control the vehicle in the blocked state. The blocking signal is generated when the intoxicating substance intake level detected in real time in the potential driver is greater than a first threshold level. Using the present vehicle driveability control apparatus, before a drunk driver can even drive the vehicle, it can be promptly determined that the intoxicating substance intake level of the drunk driver is greater than the first threshold level, and the vehicle can be promptly controlled in the blocked state that prevents the drunk driver from driving the vehicle. The present vehicle driveability control apparatus thus can effectively prevent driving under influence behavior by preventing the drunk driver from operating a vehicle after drinking.

Referring to FIG. 4, in some embodiments, the vehicle driveability controller 402, upon receiving the blocking signal, is configured to send a first actuating signal to the one or more actuators 403. Upon receiving the first actuating signal, the one or more actuators 403 are configured to prevent an electric vehicle door lock of the vehicle from receiving a signal form an electric vehicle door key to unlock the electric car door lock thereby controlling the vehicle in a blocked state. By having this design, when the one or more actuators 403 receive the first actuating signal, the one or more actuators 403 can control the electric vehicle door lock so that the electric vehicle door lock is not able to receive a signal from the electric vehicle door key to unlock the electric car door lock. The present vehicle driveability control apparatus thus can control the vehicle in a blocked state, effectively preventing the drunk driver from driving under influence.

Other actuators may be used for rendering the vehicle in a block state or transitioning from the block state to an unblocked state. Examples of appropriate actuators include, but are not limited to, a vehicle brake actuator, a vehicle throttle actuator, a vehicle steering wheel actuator, a vehicle ignition actuator, a vehicle starter actuator, etc.

Referring to FIG. 4, in some embodiments, the vehicle driveability controller 402 is configured to render the vehicle transitioning from the blocked state to an unblocked state in which the vehicle is drivable. Specifically, the one or more actuators 403 are configured to send a vehicle operation state signal to the vehicle driveability controller. Upon receiving the vehicle operation state signal, the vehicle driveability controller 402 is configured to control the second data transceiver 401 to send the vehicle operation state signal (e.g., to the first data transceiver 203 in FIG. 2). Subsequent to sending the vehicle operation state signal to the vehicle driveability controller, the second data transceiver 401 is configured to receive an unblocking signal, and send the unblocking signal to the vehicle driveability controller 402. Upon receiving the unblocking signal, the vehicle driveability controller 402 is configured to control the one or more actuators 403 to render the vehicle transitioning from the blocked state to an unblocked state in which the vehicle is drivable. This allows the potential driver to operate the vehicle safely when the potential driver is no longer under influence, e.g., when the intoxicating substance intake level detected in the potential driver is lower than or equal to the second threshold level. Optionally, the second threshold level is the same as the first threshold level. Optionally, the second threshold level is different from the first threshold level.

In some embodiments, the one or more actuators 403 are configured to acquire the vehicle operation state signal in real time. In some embodiments, the one or more actuators 403 are configured to acquire the vehicle operation state signal at intervals. Optionally, the one or more actuators 403 are configured to acquire the vehicle operation state signal in real time and sends in real time the acquired vehicle operation state signal to the vehicle driveability controller 402, and the vehicle driveability controller 402 is configured to control the second data transceiver 401 to send the vehicle operation state signal in real time. Optionally, the one or more actuators 403 are configured to acquire the vehicle operation state signal in real time and sends in real time the acquired vehicle operation state signal to the vehicle driveability controller 402, and the vehicle driveability controller 402 is configured to control the second data transceiver 401 to send the vehicle operation state signal at intervals. Optionally, the one or more actuators 403 are configured to acquire the vehicle operation state signal at certain time intervals and sends at the same certain time intervals the acquired vehicle operation state signal to the vehicle driveability controller 402, and the vehicle driveability controller 402 is configured to control the second data transceiver 401 to send the vehicle operation state signal at the same certain time intervals. Optionally, the one or more actuators 403 are configured to acquire the vehicle operation state signal in real time and sends at certain time intervals the acquired vehicle operation state signal to the vehicle driveability controller 402, and the vehicle driveability controller 402 is configured to control the second data transceiver 401 to send the vehicle operation state signal at the same certain time intervals. Optionally, the one or more actuators 403 are configured to acquire the vehicle operation state signal in real time and sends at every one minute the acquired vehicle operation state signal to the vehicle driveability controller 402, and the vehicle driveability controller 402 is configured to control the second data transceiver 401 to send the vehicle operation state signal at every one minute.

Referring to FIG. 4, in some embodiments, the vehicle driveability controller 402 is configured to render the vehicle transitioning from the blocked state to an unblocked state in which the vehicle is drivable. Specifically, subsequent to sending the vehicle operation state signal, the second data transceiver 401 is configured to receive an unblocking signal, and send the unblocking signal to the vehicle driveability controller 402. Upon receiving the unblocking signal, the vehicle driveability controller 402 is configured to control the one or more actuators 403 to render the vehicle transitioning from the blocked state to an unblocked state in which the vehicle is drivable. This allows the potential driver to operate the vehicle safely when the potential driver is no longer under influence, e.g., when the intoxicating substance intake level detected in the potential driver is lower than or equal to the second threshold level. Optionally, the second threshold level is the same as the first threshold level. Optionally, the second threshold level is different from the first threshold level.

In some embodiments, the one or more actuators 403 are configured to send a vehicle operation state signal indicating that the vehicle is in the blocked state to the vehicle driveability controller 402; upon receiving the vehicle operation state signal the vehicle driveability controller 402 is configured to control the second data transceiver 401 to send the vehicle operation state signal; the second data transceiver 401, subsequent to sending the vehicle operation state signal indicating that the vehicle is in the blocked state, is configured to receive an unblocking signal, and send the unblocking signal to the vehicle driveability controller 402; the vehicle driveability controller 402, upon receiving the unblocking signal, is configured to control the one or more actuators 403 to render the vehicle transitioning from the blocked state to an unblocked state in which the vehicle is drivable, allowing the potential driver to operate the vehicle safely when the potential driver is no longer under influence. In another example, when the vehicle operation state signal acquired by the one or more actuators 403 indicates that the current vehicle operation state is already an unblocking state, the one or more actuators 403 send the vehicle operation state signal indicating that the vehicle is in the unblocked state to the vehicle driveability controller 402, the vehicle driveability controller 402 controls the second data transceiver 401 to send the vehicle operation state signal indicating that the vehicle is in the unblocked state, it is not necessary to further control the one or more actuators 403 to change the vehicle operation state, obviating unnecessary work process.

Referring to FIG. 4, in some embodiments, upon receiving the unblocking signal, the vehicle driveability controller 402 is configured to send a second actuating signal to the one or more actuators 403. Upon receiving the second actuating signal, the one or more actuators 403 is configured to render the vehicle transitioning from the blocked state to an unblocked state in which the vehicle is drivable. Optionally, upon receiving the second actuating signal, the one or more actuators 403 is configured to enable the electric vehicle door lock to receive a signal from the electric vehicle door key to unlock the electric car door lock. In one example, the one or more actuators 403 is configured to enable the electric vehicle door lock to receive an unlocking signal from the electric vehicle door key to unlock the electric car door lock. In another example, the one or more actuators 403 is configured to enable the electric vehicle door lock to receive a locking signal from the electric vehicle door key to lock the electric car door lock. This allows the potential driver to operate the vehicle safely when the potential driver is no longer under influence.

Any appropriate wireless transceiver may be used as the second data transceiver according to the present disclosure. Optionally, the second data transceiver includes a Bluetooth capable of sending a Bluetooth feature code. Optionally, both the first data transceiver and the second data transceiver include a Bluetooth capable of sending a Bluetooth feature code. When the potential driver is wearing the vehicle control wearable apparatus for the first time, the first data transceiver and the second data transceiver can be paired with each other. Subsequently, when the first data transceiver and the second data transceiver are both maintained in a powered-on state, the first data transceiver (e.g., disposed in the vehicle control wearable apparatus) may automatically connect and communicate with the second data transceiver (e.g., disposed in the vehicle) when a distance between the vehicle control wearable apparatus and the vehicle are within the Bluetooth detection range.

Optionally, the vehicle operation state controller includes a single-chip computer, e.g., a PIC16F877A or PIC18F4680 manufactured by Microchip.

Optionally, the one or more actuators include a control circuit.

In another aspect, the present disclosure provides a system for controlling a vehicle operation, the system includes a vehicle control wearable apparatus and a vehicle driveability control apparatus as described herein. In some embodiments, the vehicle control wearable apparatus includes an intoxicating substance level detector configured to detect in real time an intoxicating substance intake level of a potential driver of a vehicle; a vehicle operation state controller coupled to the intoxicating substance level detector and configured to receive the intoxicating substance intake level from the intoxicating substance level detector; and a first data transceiver coupled to the vehicle operation state controller. In some embodiments, the vehicle driveability control apparatus includes a second data transceiver; a vehicle driveability controller coupled to the second data transceiver; and one or more actuators coupled to the vehicle driveability controller. In some embodiments, the vehicle operation state controller is configured to conduct a comparison between the intoxicating substance intake level and a first threshold level at a first time point, and control the first data transceiver to send a blocking signal to the second data transceiver based on a first result of the comparison at the first time point, the blocking signal controlling the vehicle in the blocked state that prevents the potential driver from driving the vehicle; the second data transceiver is configured to receive the blocking signal from the first data transceiver and send the blocking signal to the vehicle driveability controller; and the vehicle driveability controller, upon receiving the blocking signal from the second data transceiver, is configured to control the one or more actuators to render the vehicle in the blocked state.

In some embodiments, the vehicle driveability controller, upon receiving the blocking signal, is configured to send a first actuating signal to the one or more actuators. Upon receiving the first actuating signal the one or more actuators are configured to prevent an electric vehicle door lock of the vehicle from receiving a signal form an electric vehicle door key to unlock the electric car door lock thereby controlling the vehicle in a blocked state.

In some embodiments, the one or more actuators are configured to send a vehicle operation state signal indicating that the vehicle is in the blocked state to the vehicle driveability controller. Upon receiving the vehicle operation state signal the vehicle driveability controller is configured to control the second data transceiver to send the vehicle operation state signal to the first data transceiver. The first data transceiver is configured to receive the vehicle operation state signal from the second data transceiver indicating that the vehicle is in the blocked state. The vehicle operation state controller is configured to conduct the comparison between the intoxicating substance intake level and the second threshold level at a second time point later in time than the first time point, and control the first data transceiver to send an unblocking signal based on a second result of the comparison at the second time point; the unblocking signal controlling the vehicle to transition from the blocked state to an unblocked state in which the vehicle is drivable. Optionally, the second threshold level is the same as the first threshold level. Optionally, the second threshold level is different from the first threshold level.

In some embodiments, the second data transceiver, upon receiving the unblocking signal, send the unblocking signal to the vehicle driveability controller. The vehicle driveability controller, upon receiving the unblocking signal, is configured to control the one or more actuators to render the vehicle transitioning from the blocked state to an unblocked state in which the vehicle is drivable.

In some embodiments, the vehicle driveability controller, upon receiving the unblocking signal, is configured to send a second actuating signal to the one or more actuators. The one or more actuators, upon receiving the second actuating signal, is configured to enable the electric vehicle door lock to receive a signal from the electric vehicle door key to unlock the electric car door lock.

In some embodiments, the vehicle control wearable apparatus of the system further includes an anticircumvention device coupled to the vehicle operation state controller. Optionally, the vehicle operation state controller is configured to control the anticircumvention device to render the wearable apparatus unremovable from the potential driver based on the first result of the comparison. Optionally, the vehicle operation state controller is configured to control the anticircumvention device to render the wearable apparatus removable from the potential driver based on the second result of the comparison.

In some embodiments, the vehicle control wearable apparatus of the system further includes an alarm device. Optionally, the vehicle operation state controller is configured to control the alarm device to generate an alarm based on the first result of the comparison. Optionally, the vehicle operation state controller is configured to control the alarm device to turn off the alarm based on the second result of the comparison.

In another aspect, the present disclosure provides a method of controlling a vehicle operation. In some embodiments, the method includes detecting in real time an intoxicating substance intake level of a potential driver of a vehicle; conducting a comparison between the intoxicating substance intake level and a first threshold level at a first time point; sending a blocking signal based on a first result of the comparison at the first time point, and controlling the vehicle in a blocked state that prevents the potential driver from driving the vehicle based on the blocking signal. In some embodiments, the method further includes receiving a vehicle operation state signal from the vehicle indicating that the vehicle is in the blocked state; conducting the comparison between the intoxicating substance intake level and the second threshold level at a second time point later in time than the first time point; sending an unblocking signal based on a second result of the comparison at the second time point; and controlling the vehicle to transition from the blocked state to an unblocked state in which the vehicle is drivable based on the unblocking signal. Optionally, the second threshold level is the same as the first threshold level. Optionally, the second threshold level is different from the first threshold level. Optionally, the step of controlling the vehicle in the blocked state includes preventing an electric vehicle door lock of the vehicle from receiving a signal form an electric vehicle door key to unlock the electric car door lock thereby controlling the vehicle in a blocked state. Optionally, the step of controlling the vehicle to transition from the blocked state to the unblocked state includes enabling the electric vehicle door lock to receive a signal from the electric vehicle door key to unlock the electric car door lock.

Figure 5:
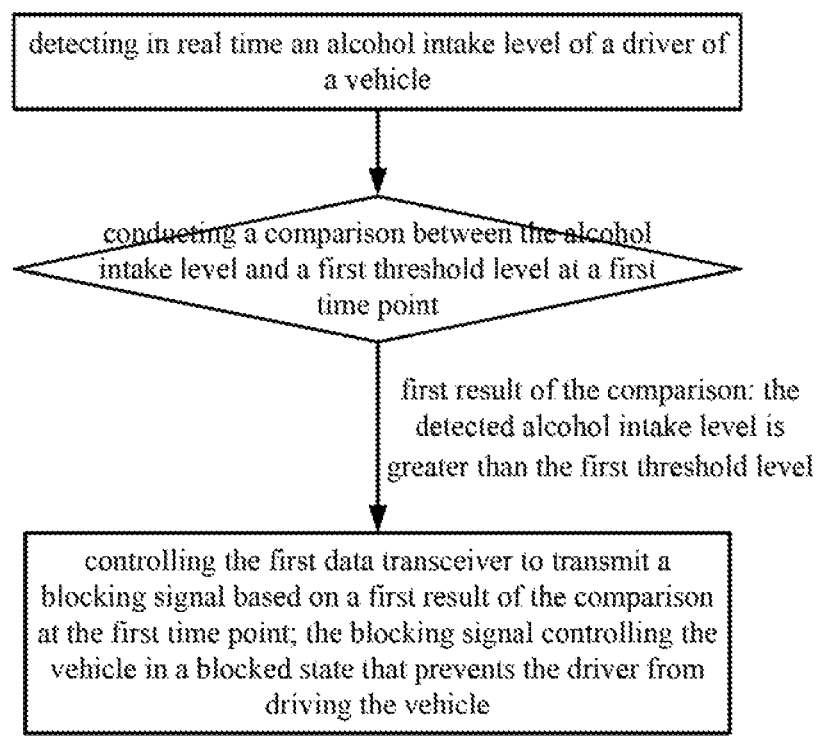
FIG. 5 is a flow chart illustrating a method of controlling a vehicle operation in some embodiments according to the present disclosure.

FIG. 5 is a flow chart illustrating a method of controlling a vehicle operation in some embodiments according to the present disclosure. Referring to FIG. 5, the method in some embodiments includes detecting in real time an intoxicating substance intake level of a potential driver of a vehicle; conducting a comparison between the intoxicating substance intake level and a first threshold level at a first time point; and controlling the first data transceiver to send a blocking signal based on a first result of the comparison at the first time point; the blocking signal controlling the vehicle in a blocked state that prevents the potential driver from driving the vehicle. Optionally, the first result of the comparison indicates that the potential driver is drunk, e.g., the detected intoxicating substance intake level is greater than the threshold vale. Optionally, the first result of the comparison indicates that the detected BAC value is greater than 0.08%. Optionally, the first result of the comparison indicates that the detected BAC value is greater than 0.05%.

Using the present method, before a drunk driver can drive the vehicle, the vehicle control wearable apparatus can promptly determine that the intoxicating substance intake level of the drunk driver is greater than the first threshold level, and promptly control the vehicle in a blocked state that prevents the drunk driver from driving the vehicle. The present method thus can effectively prevent driving under influence behavior by preventing the drunk driver from operating a vehicle after drinking.

In some embodiments, the method in some embodiments includes detecting in real time an intoxicating substance intake level of a potential driver of a vehicle; and conducting a comparison between the intoxicating substance intake level and a first threshold level at a first time point. Optionally, the comparison leads to a second result of the comparison indicating that the potential driver is not drunk, e.g., the detected intoxicating substance intake level is lower than or equal to the threshold vale. Based on the second result of comparison, no subsequent controlling is necessary, e.g., the vehicle operation state may be maintained unchanged. Optionally, the first result of the comparison indicates that the detected BAC value is lower than or equal to 0.08%. Optionally, the first result of the comparison indicates that the detected BAC value is lower than or equal to 0.05%.

In some embodiments, when the vehicle is in a blocked state, the vehicle cannot be driven by a potential driver or any third party. Optionally, when the vehicle is in the blocked state, a door of the vehicle cannot be opened. Optionally, when the vehicle is in the blocked state, the vehicle cannot be started. Optionally, when the vehicle is in the blocked state, the vehicle ignition cannot occur. Optionally, when the vehicle is in the blocked state, the brake of the vehicle cannot be released. Optionally, when the vehicle is in the blocked state, the throttle of the vehicle is actuated so that no fuel can enter the engine. Optionally, when the vehicle is in the blocked state, the steering wheel of the vehicle is locked.

Figure 6:
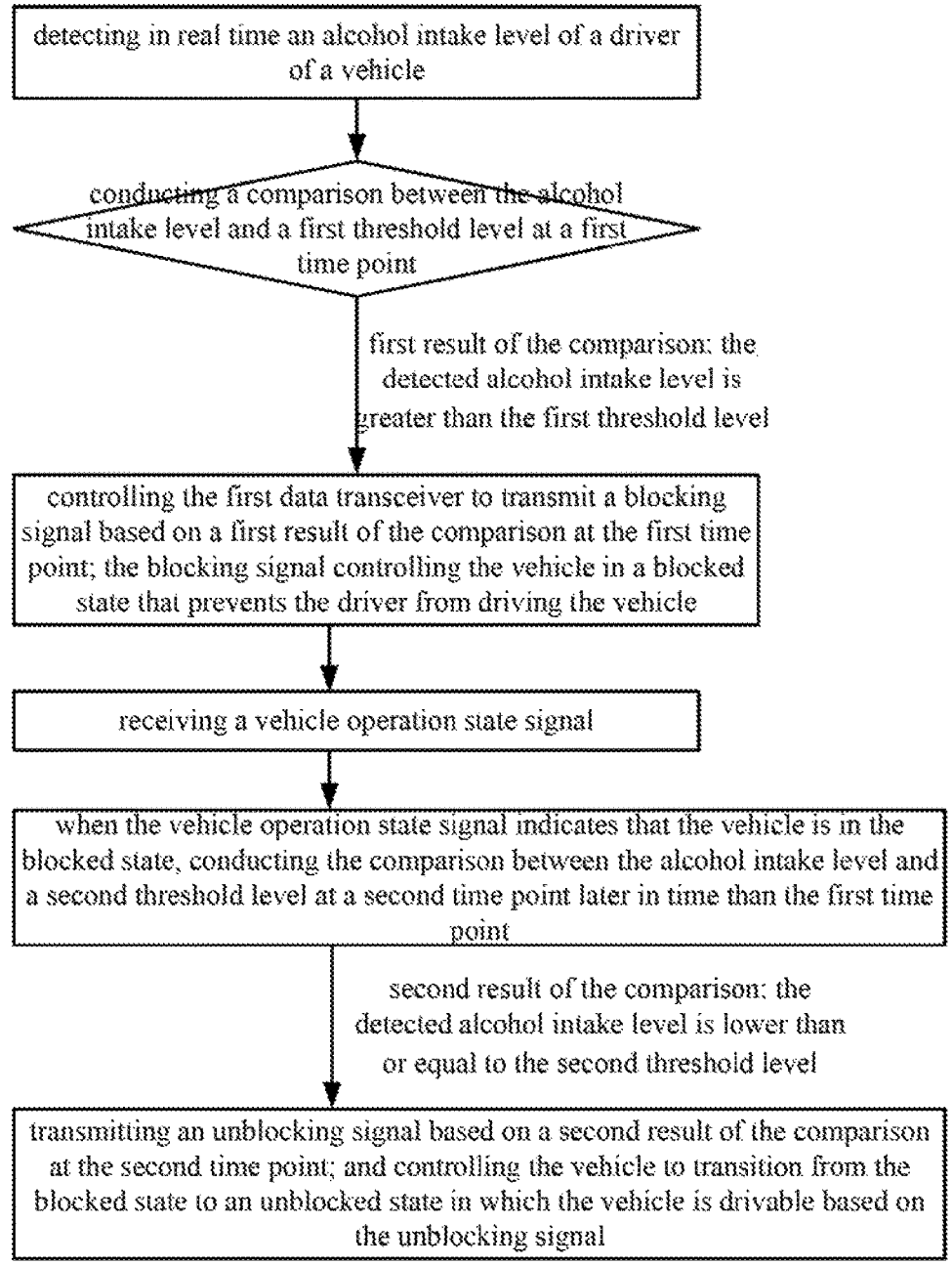
FIG. 6 is a flow chart illustrating a method of controlling a vehicle operation in some embodiments according to the present disclosure.

FIG. 6 is a flow chart illustrating a method of controlling a vehicle operation in some embodiments according to the present disclosure. Referring to FIG. 6, the method in some embodiments further includes receiving a vehicle operation state signal (e.g., from the vehicle) indicating that the vehicle is in the blocked state; conducting the comparison between the intoxicating substance intake level and the second threshold level at a second time point later in time than the first time point; sending an unblocking signal based on a second result of the comparison at the second time point; and controlling the vehicle to transition from the blocked state to an unblocked state in which the vehicle is drivable based on the unblocking signal. Optionally, the second threshold level is the same as the first threshold level. Optionally, the second threshold level is different from the first threshold level. Optionally, the second result of the comparison indicates that the potential driver is not drunk, e.g., the detected intoxicating substance intake level is lower than or equal to the threshold vale. Optionally, the first result of the comparison indicates that the detected BAC value is lower than or equal to 0.08%. Optionally, the first result of the comparison indicates that the detected BAC value is lower than or equal to 0.05%.

The present method controls the vehicle in the blocked state when the intoxicating substance intake level detected in the potential driver is greater than the first threshold level. When the intoxicating substance intake level detected in the potential driver decreases over time to a level that is lower than or equal to the second threshold level, the method can further control the operation state of the vehicle based on a feedback from the vehicle on the current operation state of the vehicle. Optionally, the second threshold level is the same as the first threshold level. Optionally, the second threshold level is different from the first threshold level. For example, when the feedback from the vehicle indicates that the current operation state of the vehicle is a blocked state, the method includes sending the unblocking signal to control to vehicle to transition from the blocked state to an unblocked state in which the vehicle is drivable. This allows the potential driver to operate the vehicle safely when the potential driver is no longer under influence, e.g., not drunk. In another example, when the feedback from the vehicle indicates that the current operation state of the vehicle is already an unblocking state, it is not necessary to send the unblocking signal, obviating unnecessary work process.

Figure 7:
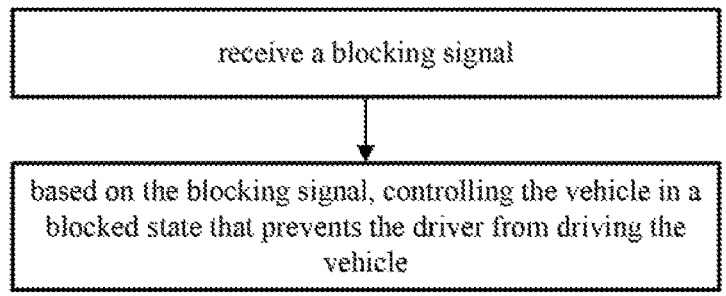
FIG. 7 is a flow chart illustrating a method of controlling a vehicle operation in some embodiments according to the present disclosure.

FIG. 7 is a flow chart illustrating a method of controlling a vehicle operation in some embodiments according to the present disclosure. Referring to FIG. 7, the method in some embodiments includes receiving a blocking signal; and, based on the blocking signal, controlling the vehicle in a blocked state that prevents the potential driver from driving the vehicle.

After receiving the blocking signal, the present method controls the vehicle in the blocked state based on the received blocking signal. The blocking signal is generated when the intoxicating substance intake level detected in real time in the potential driver is greater than a first threshold level. Using the present method, before a drunk driver can even drive the vehicle, it can be promptly determined that the intoxicating substance intake level of the drunk driver is greater than the first threshold level, and the vehicle can be promptly controlled in the blocked state that prevents the drunk driver from driving the vehicle. The present method thus can effectively prevent driving under influence behavior by preventing the drunk driver from operating a vehicle after drinking.

Various appropriate methods of preventing the potential driver from driving the vehicle may be used. Optionally, the method includes preventing an electric vehicle door lock of the vehicle from receiving a signal form an electric vehicle door key to unlock the electric car door lock thereby controlling the vehicle in a blocked state. Optionally, the method includes preventing vehicle ignition by a key or a keyless button.

Figure 8:
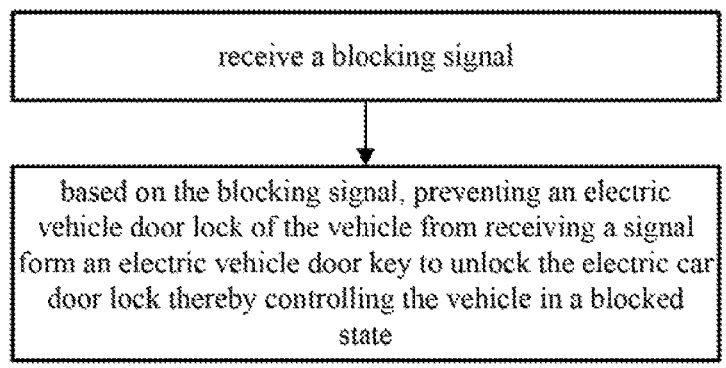
FIG. 8 is a flow chart illustrating a method of controlling a vehicle operation in some embodiments according to the present disclosure.

FIG. 8 is a flow chart illustrating a method of controlling a vehicle operation in some embodiments according to the present disclosure. Referring to FIG. 8, the method in some embodiments includes receive a blocking signal; and, based on the blocking signal, preventing an electric vehicle door lock of the vehicle from receiving a signal form an electric vehicle door key to unlock the electric car door lock thereby controlling the vehicle in a blocked state. By having this design, after the blocking signal is received, the method controls the electric vehicle door lock so that the electric vehicle door lock is not able to receive a signal from the electric vehicle door key to unlock the electric car door lock. The present method thus can control the vehicle in a blocked state, effectively preventing the drunk driver from driving under influence.

Figure 9:
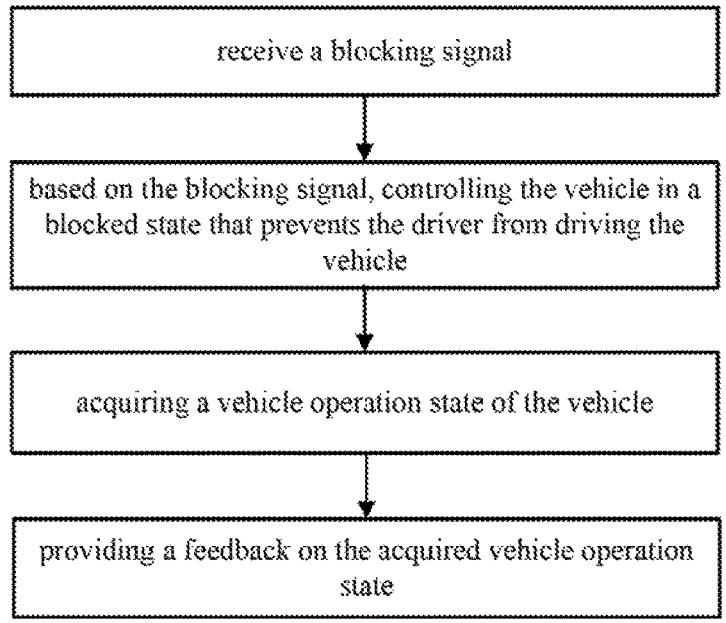
FIG. 9 is a flow chart illustrating a method of controlling a vehicle operation in some embodiments according to the present disclosure.

FIG. 9 is a flow chart illustrating a method of controlling a vehicle operation in some embodiments according to the present disclosure. Referring to FIG. 9, the method in some embodiments further includes acquiring a vehicle operation state of the vehicle; and providing a feedback on the acquired vehicle operation state. The present method controls the vehicle in the blocked state when the intoxicating substance intake level detected in the potential driver is greater than the first threshold level. When the intoxicating substance intake level detected in the potential driver decreases over time to a level that is lower than or equal to the second threshold level, the method can further control the operation state of the vehicle based on a feedback from the vehicle on the current operation state of the vehicle. Optionally, the second threshold level is the same as the first threshold level. Optionally, the second threshold level is different from the first threshold level.

In some embodiments, the method includes acquiring the vehicle operation state signal in real time. In some embodiments, the method includes acquiring the vehicle operation state signal at intervals. Optionally, the method includes acquiring the vehicle operation state signal in real time and providing a feedback on the acquired vehicle operation state in real time. Optionally, the method includes acquiring the vehicle operation state signal in real time and providing a feedback on the acquired vehicle operation state at intervals. Optionally, the method includes acquiring the vehicle operation state signal at intervals and providing a feedback on the acquired vehicle operation state at intervals. Optionally, the method includes acquiring the vehicle operation state signal at certain time intervals and providing a feedback on the acquired vehicle operation state at the same certain time intervals. Optionally, the method includes acquiring the vehicle operation state signal in real time and providing a feedback on the acquired vehicle operation state at every one minute.

Figure 10:
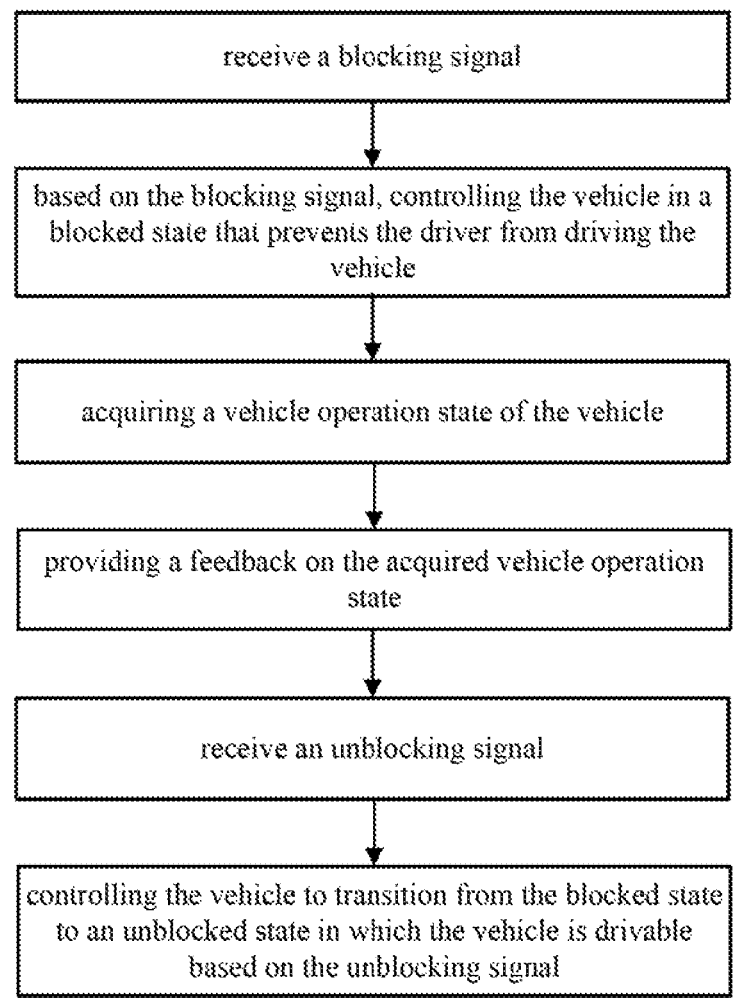
FIG. 10 is a flow chart illustrating a method of controlling a vehicle operation in some embodiments according to the present disclosure.

FIG. 10 is a flow chart illustrating a method of controlling a vehicle operation in some embodiments according to the present disclosure. Referring to FIG. 10, the method in some embodiments further includes receive an unblocking signal; and controlling the vehicle to transition from the blocked state to an unblocked state in which the vehicle is drivable based on the unblocking signal. This allows the potential driver to operate the vehicle safely when the potential driver is no longer under influence, e.g., when the intoxicating substance intake level detected in the potential driver is lower than or equal to the second threshold level. Optionally, the second threshold level is the same as the first threshold level. Optionally, the second threshold level is different from the first threshold level. In one example, a vehicle operation state indicating that the vehicle is in the blocked state is acquired, the method further includes providing a feedback on the acquired vehicle operation state indicating that the vehicle is in the blocked state; receiving the unblocking signal, and controlling the vehicle to transition from the blocked state to an unblocked state in which the vehicle is drivable based on the unblocking signal, allowing the potential driver to operate the vehicle safely when the potential driver is no longer under influence. In another example, when the vehicle operation state signal acquired indicates that the current vehicle operation state is already an unblocking state, the method further includes providing a feedback on the acquired vehicle operation state indicating that the vehicle is in the unblocked state. It is not necessary to further change the vehicle operation state, obviating unnecessary work process.

Figure 11:
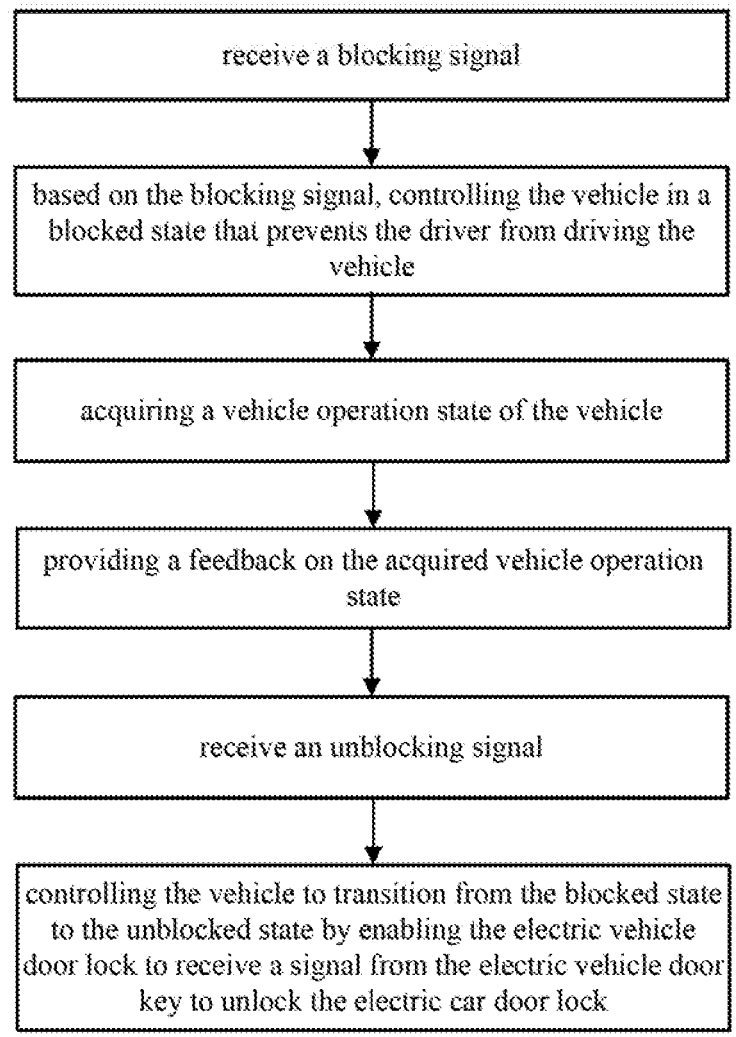
FIG. 11 is a flow chart illustrating a method of controlling a vehicle operation in some embodiments according to the present disclosure.

In some embodiments, the step of controlling the vehicle to transition from the blocked state to the unblocked state includes enabling the electric vehicle door lock to receive a signal from the electric vehicle door key to unlock the electric car door lock. FIG. 11 is a flow chart illustrating a method of controlling a vehicle operation in some embodiments according to the present disclosure. Referring to FIG. 11, the method in some embodiments further includes controlling the vehicle to transition from the blocked state to the unblocked state by enabling the electric vehicle door lock to receive a signal from the electric vehicle door key to unlock the electric car door lock. By having this design, after the unblocking signal is received, the method controls the electric vehicle door lock so that the electric vehicle door lock is able to receive a signal from the electric vehicle door key. In one example, the electric vehicle door lock is enabled to receive an unlocking signal from the electric vehicle door key to unlock the electric car door lock. In another example, the electric vehicle door lock is enabled to receive a locking signal from the electric vehicle door key to lock the electric car door lock. This allows the potential driver to operate the vehicle safely when the potential driver is no longer under influence.

The present disclosure provides a vehicle control wearable apparatus, a vehicle driveability control apparatus, a system for controlling a vehicle operation, and a method for controlling a vehicle operation. The system for controlling a vehicle operation includes the vehicle control wearable apparatus and the vehicle driveability control apparatus. The vehicle control wearable apparatus is wearable on a potential driver's body. The intoxicating substance level detector of the vehicle control wearable apparatus is capable of detecting an intoxicating substance intake level of the potential driver in real time, and sending the detected intoxicating substance intake level to the vehicle operation state controller. The vehicle operation state controller is capable of comparing the detected intoxicating substance intake level with a first threshold level. When the detected intoxicating substance intake level is greater than the first threshold level, the vehicle operation state controller controls the first data transceiver to send a blocking signal to control the vehicle in a blocked state that prevents the potential driver from driving the vehicle. Using the present vehicle control wearable apparatus, before a drunk driver can even drive the vehicle, the vehicle control wearable apparatus can promptly determine that the intoxicating substance intake level of the drunk driver is greater than the first threshold level, and promptly control the vehicle in the blocked state that prevents the drunk driver from driving the vehicle. The present vehicle control wearable apparatus thus can effectively prevent driving under influence behavior by preventing the drunk driver from operating a vehicle after drinking.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A vehicle control wearable apparatus, comprising:
 a detector configured to detect an intoxicating substance intake level of a potential driver of a vehicle;
 a vehicle operation state controller coupled to the detector and configured to receive the intoxicating substance intake level from the detector;
 an anticircumvention device coupled to the vehicle operation state controller; and
 a first data transceiver coupled to the vehicle operation state controller;
 wherein the vehicle operation state controller is configured to conduct a comparison between the intoxicating substance intake level and a first threshold level, and control the first data transceiver to send a blocking signal based on a first result of the comparison at a first time point; the blocking signal controlling the vehicle in a blocked state thereby prevents the potential driver from driving the vehicle;
 the vehicle operation state controller is configured to control the anticircumvention device to render the vehicle control wearable apparatus unremovable from the potential driver based on the first result of the comparison; and
 the first result of the comparison indicates that the intoxicating substance intake level is greater than the first threshold level.

2. The vehicle control wearable apparatus of claim 1, wherein the first data transceiver is configured to receive a vehicle operation state signal from the vehicle indicating that the vehicle is in a blocked state;
 the vehicle operation state controller is configured to conduct the comparison between the intoxicating substance intake level and a second threshold level at a second time point later in time than the first time point, and control the first data transceiver to send an unblocking signal based on a second result of the comparison at the second time point; the unblocking signal controlling the vehicle to transition from the blocked state to an unblocked state in which the vehicle is drivable; and the second result of the comparison indicates that the intoxicating substance intake level is lower than or equal to the second threshold level.

3. The vehicle control wearable apparatus of claim 2, further comprising an anticircumvention device coupled to the vehicle operation state controller;
   wherein the vehicle operation state controller is configured to control the anticircumvention device to render the vehicle control wearable apparatus removable from the potential driver based on the second result of the comparison.

4. The vehicle control wearable apparatus of claim 2, further comprising an alarm device;
   wherein the vehicle operation state controller is configured to control the alarm device to generate an alarm based on the first result of the comparison; and
   the vehicle operation state controller is configured to control the alarm device to turn off the alarm based on the second result of the comparison.

5. The vehicle control wearable apparatus of claim 1, further comprising an alarm device;
   wherein the vehicle operation state controller is configured to control the alarm device to generate an alarm based on the first result of the comparison.

6. A vehicle driveability control apparatus coupled to the vehicle control wearable apparatus of claim 1, comprising:
   a second data transceiver configured to receive a blocking signal for controlling a vehicle in a blocked state that prevents a potential driver from driving the vehicle;
   a vehicle driveability controller coupled to the second data transceiver and configured to receive the blocking signal from the second data transceiver; and
   one or more actuators coupled to the vehicle driveability controller;
   wherein the vehicle driveability controller is configured to control the one or more actuators to render the vehicle in the blocked state.

7. The vehicle driveability control apparatus of claim 6, wherein the vehicle driveability controller, upon receiving the blocking signal, is configured to send a first actuating signal to the one or more actuators;
   upon receiving the first actuating signal the one or more actuators are configured to prevent an electric vehicle door lock of the vehicle from receiving a signal form an electric vehicle door key to unlock the electric vehicle door lock thereby controlling the vehicle in a blocked state.

8. The vehicle driveability control apparatus of claim 7, wherein the one or more actuators are configured to send a vehicle operation state signal indicating that the vehicle is in the blocked state to the vehicle driveability controller; and
   upon receiving the vehicle operation state signal the vehicle driveability controller is configured to control the second data transceiver to send the vehicle operation state signal.

9. The vehicle driveability control apparatus of claim 8, wherein the second data transceiver, subsequent to sending the vehicle operation state signal indicating that the vehicle is in the blocked state, is configured to receive an unblocking signal, and send the unblocking signal to the vehicle driveability controller; and
   the vehicle driveability controller, upon receiving the unblocking signal, is configured to control the one or more actuators to render the vehicle transitioning from the blocked state to an unblocked state in which the vehicle is drivable.

10. The vehicle driveability control apparatus of claim 9, wherein the vehicle driveability controller, upon receiving the unblocking signal, is configured to send a second actuating signal to the one or more actuators; and
    the one or more actuators, upon receiving the second actuating signal, is configured to enable the electric vehicle door lock to receive a signal from the electric vehicle door key to unlock the electric vehicle door lock.

11. A system for controlling a vehicle operation, comprising a vehicle control wearable apparatus and a vehicle driveability control apparatus;
    wherein the vehicle control wearable apparatus comprises:
    a detector configured to detect an intoxicating substance intake level of a potential driver of a vehicle;
    a vehicle operation state controller coupled to the detector and configured to receive the intoxicating substance intake level from the detector;
    an anticircumvention device coupled to the vehicle operation state controller; and
    a first data transceiver coupled to the vehicle operation state controller;
    wherein the vehicle driveability control apparatus comprises:
    a second data transceiver;
    a vehicle driveability controller coupled to the second data transceiver; and
    one or more actuators coupled to the vehicle driveability controller;
    wherein the vehicle operation state controller is configured to conduct a comparison between the intoxicating substance intake level and a first threshold level, and control the first data transceiver to send a blocking signal to the second data transceiver based on a first result of the comparison at a first time point, the blocking signal controlling the vehicle in a blocked state thereby prevents the potential driver from driving the vehicle;
    the second data transceiver is configured to receive the blocking signal from the first data transceiver and send the blocking signal to the vehicle driveability controller;
    the vehicle driveability controller, upon receiving the blocking signal from the second data transceiver, is configured to control the one or more actuators to render the vehicle in the blocked state;
    the vehicle operation state controller is configured to control the anticircumvention device to render the vehicle control wearable apparatus unremovable from the potential driver based on the first result of the comparison; and
    the first result of the comparison indicates that the intoxicating substance intake level is greater than the first threshold level.

12. The system of claim 11, wherein the vehicle driveability controller, upon receiving the blocking signal, is configured to send a first actuating signal to the one or more actuators; and
    upon receiving the first actuating signal the one or more actuators are configured to prevent an electric vehicle door lock of the vehicle from receiving a signal form an electric vehicle door key to unlock the electric vehicle door lock thereby controlling the vehicle in a blocked state.

13. The system of claim 11, wherein the one or more actuators are configured to send a vehicle operation state signal indicating that the vehicle is in the blocked state to the vehicle driveability controller;

upon receiving the vehicle operation state signal the vehicle driveability controller is configured to control the second data transceiver to send the vehicle operation state signal to the first data transceiver;

the first data transceiver is configured to receive the vehicle operation state signal from the second data transceiver indicating that the vehicle is in the blocked state;

the vehicle operation state controller is configured to conduct the comparison between the intoxicating substance intake level and a second threshold level at a second time point later in time than the first time point, and control the first data transceiver to send an unblocking signal based on a second result of the comparison at the second time point; the unblocking signal controlling the vehicle to transition from the blocked state to an unblocked state in which the vehicle is drivable; and the second result of the comparison indicates that the intoxicating substance intake level is lower than or equal to the second threshold level.

14. The system of claim 13, wherein the second data transceiver, upon receiving the unblocking signal, sends the unblocking signal to the vehicle driveability controller; and the vehicle driveability controller, upon receiving the unblocking signal, is configured to control the one or more actuators to render the vehicle transitioning from the blocked state to an unblocked state in which the vehicle is drivable.

15. The system of claim 14, wherein the vehicle driveability controller, upon receiving the unblocking signal, is configured to send a second actuating signal to the one or more actuators; and the one or more actuators, upon receiving the second actuating signal, is configured to enable an electric vehicle door lock to receive a signal from an electric vehicle door key to unlock the electric vehicle door lock.

16. A method of controlling a vehicle operation in a system of claim 11, comprising:

detecting an intoxicating substance intake level of a potential driver of a vehicle;

conducting a comparison between the intoxicating substance intake level and a first threshold level;

sending a blocking signal based on a first result of the comparison at a first time point;

controlling the anticircumvention device to render the vehicle control wearable apparatus unremovable from the potential driver based on the first result of the comparison; and controlling the vehicle in a blocked state thereby prevents the potential driver from driving the vehicle based on the blocking signal;

wherein the first result of the comparison indicates that the intoxicating substance intake level is greater than the first threshold level.

17. The method of claim 16, further comprising:

receiving a vehicle operation state signal from the vehicle indicating that the vehicle is in the blocked state;

conducting the comparison between the intoxicating substance intake level and a second threshold level at a second time point later in time than the first time point;

sending an unblocking signal based on a second result of the comparison at the second time point; and controlling the vehicle to transition from the blocked state to an unblocked state in which the vehicle is drivable based on the unblocking signal;

wherein the second result of the comparison indicates that the intoxicating substance intake level is lower than or equal to the second threshold level.

18. The method of claim 16, wherein controlling the vehicle in the blocked state comprises preventing an electric vehicle door lock of the vehicle from receiving a signal form an electric vehicle door key to unlock the electric vehicle door lock thereby controlling the vehicle in a blocked state.

19. The method of claim 17, wherein controlling the vehicle to transition from the blocked state to the unblocked state comprises enabling an electric vehicle door lock to receive a signal from an electric vehicle door key to unlock the electric vehicle door lock.

* * * * *